(12) United States Patent
Diamond et al.

(10) Patent No.: US 6,370,515 B1
(45) Date of Patent: Apr. 9, 2002

(54) BULK TERMINAL AUTOMATION SYSTEM

(75) Inventors: Robert A. Diamond, McKinney; Travis A. Diamond, Allen, both of TX (US)

(73) Assignee: Diamond Control Systems, Inc., Allen, TX (US)

( * ) Notice: Subject to any disclaimer, the term of this patent is extended or adjusted under 35 U.S.C. 154(b) by 0 days.

(21) Appl. No.: 09/332,494

(22) Filed: Jun. 14, 1999

(51) Int. Cl.$^7$ ............................................. G06F 153/00
(52) U.S. Cl. .............................. 705/28; 705/22; 705/23; 705/29
(58) Field of Search ......................... 705/28, 29, 22–23

(56) References Cited

U.S. PATENT DOCUMENTS

| | | | |
|---|---|---|---|
| 5,930,763 A | * | 7/1999 | Kaneko et al. ................. 705/8 |
| 5,963,919 A | * | 10/1999 | Brinkley et al. ............... 705/28 |
| 5,978,771 A | * | 11/1999 | Vandivier, III ................. 705/8 |
| 6,078,900 A | * | 6/2000 | Ettl et al. ...................... 705/28 |
| 6,148,291 A | * | 11/2000 | Radican ........................ 705/28 |

FOREIGN PATENT DOCUMENTS

| | | | | |
|---|---|---|---|---|
| CA | 2046147 | * | 1/1992 | ................... 705/28 |

OTHER PUBLICATIONS

"ChemConnect Logistics Launches", 2000, PR Newswire Assoc., Inc., The Gale Group.*
The Guardian/2 Bulk Terminal Automation System, Diamond Control Systems, Inc., 1997.

* cited by examiner

*Primary Examiner*—Douglas Hess
(74) *Attorney, Agent, or Firm*—Howison, Chauza, Thoma, Handley & Arnott, L.L.P.

(57) ABSTRACT

A bulk terminal automation system for automating and coordinating delivery operations of bulk shipping terminals. Data entry relating to customer transport requests, and driver and vehicle access data are entered at the central office, and then transmitted from the central office, through a global computer network, and to a local database located in a bulk shipping terminal, which is located remotely form the central office. Local data is collected at the bulk shipping terminal through a local network. The local data includes information relating to driver access inputs, loads collected, bills of lading, storage levels and metered units of bulk materials which are dispensed. The locally collected data is periodically transmitted to the central office and stored in a central office database which is configured in a relational database arrangement. Inventory and load shipment reconciliation reports are complied at the central office, rather than requiring redundant processing capability at separate bulk shipping terminals. The data stored in the relational database is accessed through various service modules which process the data to provide specialized reports according to various customer data requests. Customers may request standardized reports, or specialized data reports may be selectively customized by the customer. The reports generated from the central database are transmitted from the central office to the customer through the global computer network. The data reports may combine data from several terminals to provide regional data relating to consumer use and customer load shipment distribution.

34 Claims, 8 Drawing Sheets

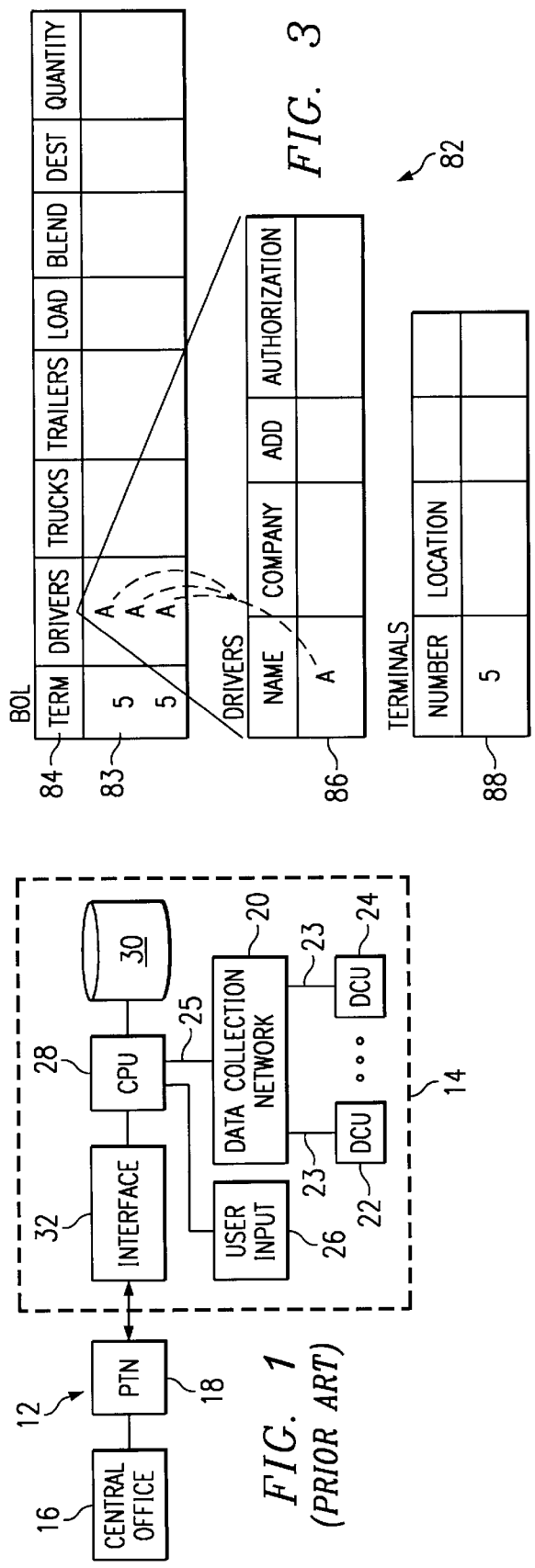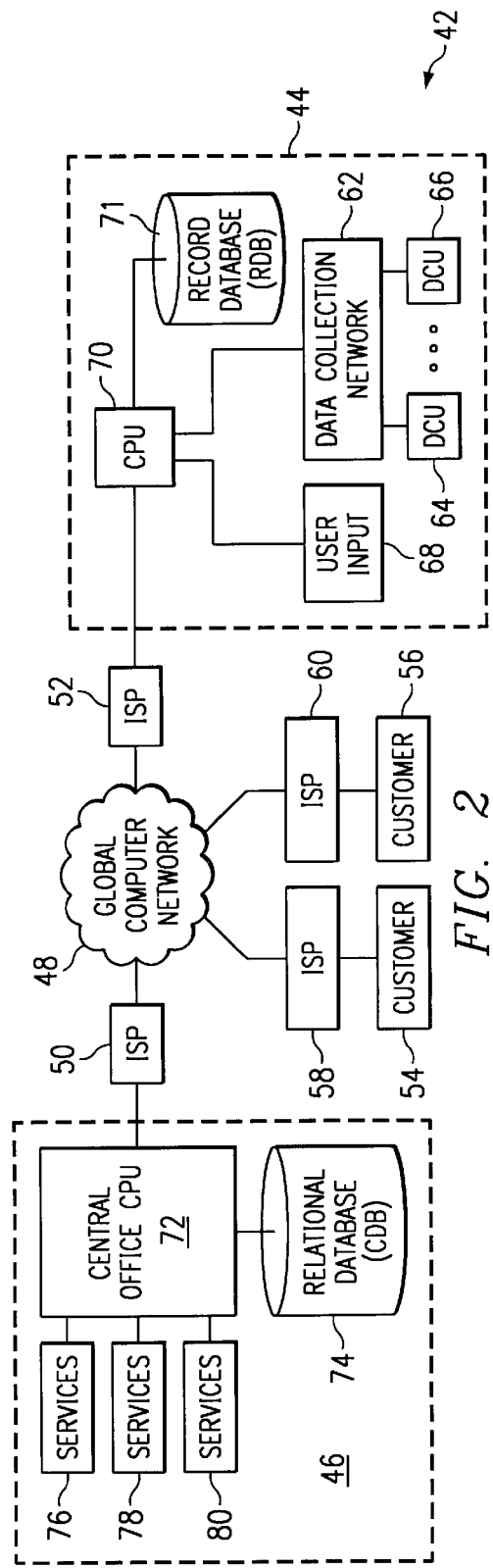

BULK TERMINAL AUTOMATION SYSTEM

TECHNICAL FIELD OF THE INVENTION

The present invention pertains in general to automation equipment for bulk shipping terminals, and in particular, to a terminal automation system for automating and coordinating delivery operations of bulk shipping terminals.

BACKGROUND OF THE INVENTION

Prior art bulk shipping terminals have included access systems which collect data relating to various loads which are transported from a single bulk shipping terminal. The collected data is stored locally at a bulk shipping terminal. Access codes for subscriber input devices are used for allowing drivers entry and access to the particular bulk shipping terminal. These access codes are entered and stored in a local database, requiring that any updating of access codes be performed manually at the particular bulk shipping terminal. The data collected from terminal monitoring and metering devices have sometimes been transferred to a central database located in a central office, which is remote from the particular bulk shipping terminal, typically by data transmissions passing through public telephone networks. The central office would typically access only limited data from a bulk shipping terminal, usually only relating to data from bills of lading and customer billing information. The primary data storage for prior art systems was located in the local databases at the bulk shipping terminals, and individual customers were not allowed access to such data. Customers were only provided data in reports which related to specific bills of lading. This presents some problems when considering the aspect of access to information. If a truck takes on a load at one loading terminal, delivers this load, and then takes on a load at another loading terminal, it is difficult to track loading information as to this truck. This is due to the fact that all information collected at each loading terminal is typically local, requiring a requestor to access information from both terminals.

SUMMARY OF THE INVENTION

In the present invention disclosed and claimed herein, there is provided a bulk terminal automation system for automating and coordinating delivery operations of bulk shipping terminals. Data entry relating to customer transport requests, and driver and vehicle access data are entered at the central office, and then transmitted from the central office, through a global computer network, and to a local database located in a bulk shipping terminal, which is located remotely from the central office. Local data is collected at the bulk shipping terminal through a local network. The local data includes information relating to driver access inputs, loads collected, bills of lading, storage levels and metered units of bulk materials which are dispensed. The locally collected data is periodically transmitted to the central office and stored in a central office database which is configured in a relational database arrangement. Inventory and load shipment reconciliation reports are complied at the central office, rather than requiring redundant processing capability at separate bulk shipping terminals. The data stored in the relational database is accessed through various service modules which process the data to provide specialized reports according to various customer data requests. Customers may request standardized reports, or specialized data reports may be selectively customized by the customer. The reports generated from the central database are transmitted from the central office to the customer through the global computer network. The data reports may combine data from several terminals to provide regional data relating to consumer use and customer load shipment distribution.

BRIEF DESCRIPTION OF THE DRAWINGS

For a more complete understanding of the present invention and the advantages thereof, reference is now made to the following description taken in conjunction with the accompanying Drawings in which:

FIG. 1 illustrates a schematic diagram of a prior art bulk terminal automation system;

FIG. 2 illustrates a schematic diagram of a bulk terminal automation system made according to the present invention;

FIG. 3 illustrates a relational database, such as may be stored in the central database of FIG. 2;

DETAILED DESCRIPTION OF THE INVENTION

Figure 4:
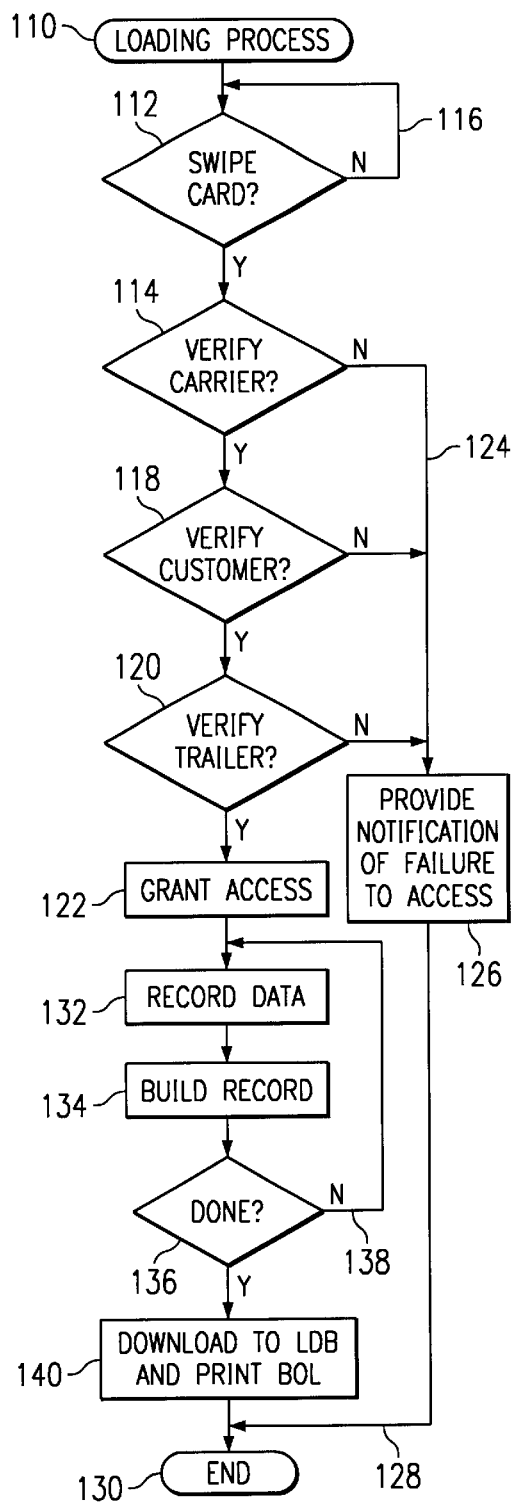
FIG. 4 illustrates a flowchart of the operation for collecting bill of lading information and allowing driver access at the bulk shipping terminal.

Referring now to FIG. 1, there is illustrated a schematic diagram of a prior art bulk terminal automation system 12. The prior bulk terminal automation system 12 includes a bulk shipping terminal 14 which is connected to a central office 16 by a public telephone network ("PTN") 18. The bulk shipping terminal 14 includes a data collection network 20, which is connected to data collection units 22 through 24. The data collection units ("DCU") 22 through 24 collect various terminal data, such as storage tank levels, metered inlet flow quantities, and metered outlet flow quantities. Driver inputs 26 are provided by card readers and data entry terminals. The data collection network 20 and the subscriber inputs 26 are connected to a central processing unit ("CPU") 28. This CPU 28 can be any type of computer, computer network, or similar processing system. The data collection network 20 is connected to the DCUs 22 through 24 via lines 23. These allow the data collection network 20 to interface with the various DCUs 22–24. The data collection network 20 can be any type of network that interfaces with the CPU 28 through an interconnection line 25. In general, the data collection network 20 is a network of lines that extend from the DCUs 22 into the CPU 28 through the interconnection line 25. Typically, these will be input to the serial input of a personal computer (PC). Further, data collection network 20 could be more sophisticated and it could comprise terminals of an Ethernet backbone.

The CPU 28 has a local database 30 associated therewith. The local database 30 will include terminal storage and driver access data, such as the bulk volume of various fluids stored in respective tanks, access data for various drivers, and the requested shipments ordered by customers. Bills of lading for loads transported from the terminal will also be stored in the database 30. The CPU 28 is connected to an interface 32. The interface 32 is typically a modem connected to the public telephone network 18. The central office 16 will likewise have various data processing and storage capability, and will be connected to the public telephone network 18 for receiving data from and transmitting data to the bulk shipping terminal 14. The data transfer through the public telephone network 18 is one-way in that data is transmitted from the bulk shipping terminal 14 to the central office 18, and not from the central office 18 to the bulk shipping terminal 14.

Referring now to FIG. 2, there is illustrated a schematic diagram of a bulk terminal automation system 42 of the present disclosure. The bulk terminal automation system 42 connects a bulk terminal 44 with a central office 46 through a global computer network 48. Internet service providers ("ISP") 50 and 52 are connected to respective ones of the central office 46 and the bulk terminal 44 for interconnecting the central office 46 and bulk terminal 44 to the global computer network 48. Customers 54 and 56 are also connected to respective ISPs 58 and 60 for accessing the global computer network 48, such that they may gain access to the central office 46. Customers 54 and 56 access the central office 46 and download subscriber software, and then are herein defined as subscribers.

The bulk shipping terminal 44 includes a data collection network 62 which is connected to data collection units ("DCUs") 64 through 66. The DCUs 64 through 66 collect various terminal data such as storage tank levels, metered flow quantities for both incoming materials and outgoing materials, tank temperatures, and the like. The data collection units 64 through 66 and the data collection network 62 are preferably provided by a proprietary data collection network, which includes electronic interface units commonly known as electronic presets, such as the AccuLoad™ devices which are available from FMC Smith Meter Inc. of Erie Pa. The data collection units 64 through 66 may also include metering devices and weight measuring devices, such as weight scales for measuring the empty weight and the loaded weight of the vehicles used for both shipping product from the terminal 44 or for shipping product into the terminal 44. The CPU 70 will interface with the proprietary data collection network 62 having DCUs 64 through 66 to acquire data for transmission to the CPU 70, and then the data is uploaded through the ISP 52 and the global communication network 48 to the ISP 50 and the central officer CPU 72 for storage in the central database 74. Driver inputs 68 are provided by card readers and data entry terminals such that terminal operators and delivery drivers may input subscriber data. The bulk terminal 44 further includes a central processing unit ("CPU") 70 which is connected to the data collection network 62 and the subscriber input 68. The CPU 70 includes a local database 71. The CPU 70 is connected by the ISP 52 to the global computer network 48 to allow data transmission to the global communication network and to receive data therefrom.

The central office 46 includes a central office CPU 72 which is connected to the global computer network 48 by the ISP 50. A relational database is provided by a the central database ("CDB") 74. Data collected from the terminal 44 is stored at the CDB 74. It should be noted that other shipping terminals, similar to the terminal 44, may be connected to the global computer network 48 for transmitting data for storage in the CDB 74. The central office 46 may provide various service modules 76, 78 and 80 at the request of various customers 54 and 56 for retrieving selected data from the CDB 74. The selected data may be forwarded in reports. The data from the CDB 74 provides various reports relating to various stored data collected from the subscriber input 68 and the data collection units 64 and 66. The reports are selectable according to various reporting modules, for customizing reports for various subscribers. Additionally, transport request and driver access data are periodically downloaded through the global computer network 48 to the CPU 70 for storage in the local database 71. Such data would include customer requested loads, driver access data, and driver access codes to allow the retrieval of customer requested loads from the terminal 44.

Referring now to FIG. 3, there is illustrated diagrammatic view of a relational database 82, such as may be stored in the central database 74 of FIG. 2. The relational database 82 includes various related tables 84, 86 and 88. Such data may include in the table 84 bill of lading information, the identity of a particular bulk shipping terminal, the identity of a particular driver transporting the related load, the particular truck and trailer used to transport the load, the amount and type of the load, blend data, and the like. The table 86 may include data relating to particular drivers. The table 88 may include metering data collected by a particular terminal.

The relational database 82 allows a large amount of information to be collected and "linked" to other information in the various tables. For example, in Table 84, a first column AD3 has associated therewith information for a given terminal, such as drivers, trucks, trailers, loads, blends, destination and quantity. If a given driver who is associated with the terminal comes in, the driver will note the truck number, the trailer number, the load number, etc., all of which comprises an entry into the database 82. Therefore, if, for example, driver "A" enters any of the terminals, information for that driver will be updated in the relational database 82. If the driver enters another terminal, the information for that driver at that second terminal will also be updated in the appropriate column i database 82. Since Table 86 is related to Table 84, i.e., linked thereto, all information in Table 86 will also be updated when corresponding data is updated in table 84. Table 86 relates to the driver. Access to table 86 will indicate information as to the company associated with the driver, the address, etc. If one wants to see how many terminals the driver has accessed, the links in the relational database 82 will allow this to be done. This is also the case with the table 88 which is associated with the terminal. One can look at the terminal table 88 and look at all information associated with Terminal 5, for example. In table 84, other information associated with the bill of lading (BOL) can be determined.

The purpose for the relational database 82 is to allow the collection of a large amount of data from the various locations which data can then be collected and sorted in relatively expedient manner. The use of these types of relational databases is conventional, and there are a number of different relational databases that can be utilized.

Referring now to FIG. 4, there is illustrated a flowchart which depicts operations for collecting bill of lading information and granting drivers access at the bulk shipping terminal 44. The loading process is initiated in step 110. A driver then swipes his access card as shown in step 112. If the card access data is successfully read in step 112, then the process will proceed to step 114 and the CPU 70 will verify that the carrier corresponding to the access data read in the card swiping step 112 is approved to access the bulk shipping terminal 44. If the data from the access card is not properly read in swiping step 112, the process will proceed along the flowpath 116 to again initiate the card swiping step 112. After the carrier is verified in step 114, the driver will input customer data indicating which load he is to pick up and the customer corresponding to the load. The CPU 70 will then verify the inputted data in step 118 by comparison with driver access data and transport request data stored in the local database 71, which has been previously downloaded from the central office 46. If the input data is verified as corresponding to the downloaded data in step 118, then the process will proceed to step 120, and the trailer data entered by the driver will then be verified. The CPU 70 will then access the local database 71 to determine whether to grant the driver access in step 122. If any of the verify carrier step 114, the verify customer step 118, or the verify trailers step 120 receives a non-verification of an entered value, then the process will proceed along path 124 to a step 126 in which notification that access is being denied will be provided to the terminal operator as an alarm. The process then proceeds from the notification step block 126, along a flowpath 128, and to the end of the loading process of step 130.

If access is granted in step 122, then the process will proceed from the grant access block 122 to a record data step 132 in which the data collection network 62 will collect data from the various DCUs 64 through 66 in the record data step 132. The CPU 70 will then build a local record in the step 134 and store the data in the local database 71. After loading has begun, the decision step 136 will determine whether loading is complete. If loading is not complete, the process will proceed from decision step 136 along a flowpath 138 to the record data step 132, to continue recording data and building a record as set forth in the steps 132 and 134, respectively. Once the truck is loaded and the completion of loading is determined in the step 136, the process will proceed to the step 140 and the data will be downloaded and stored as a record in the local database 71. The bill of lading is printed for the driver to carry during transport in the download step 140. This information will essentially correspond to each record in the table 84 of FIG. 3. The process end step 130 will occur after the data is downloaded to the local database 71 and the bill of lading is printed in the step 140.

Figure 5:
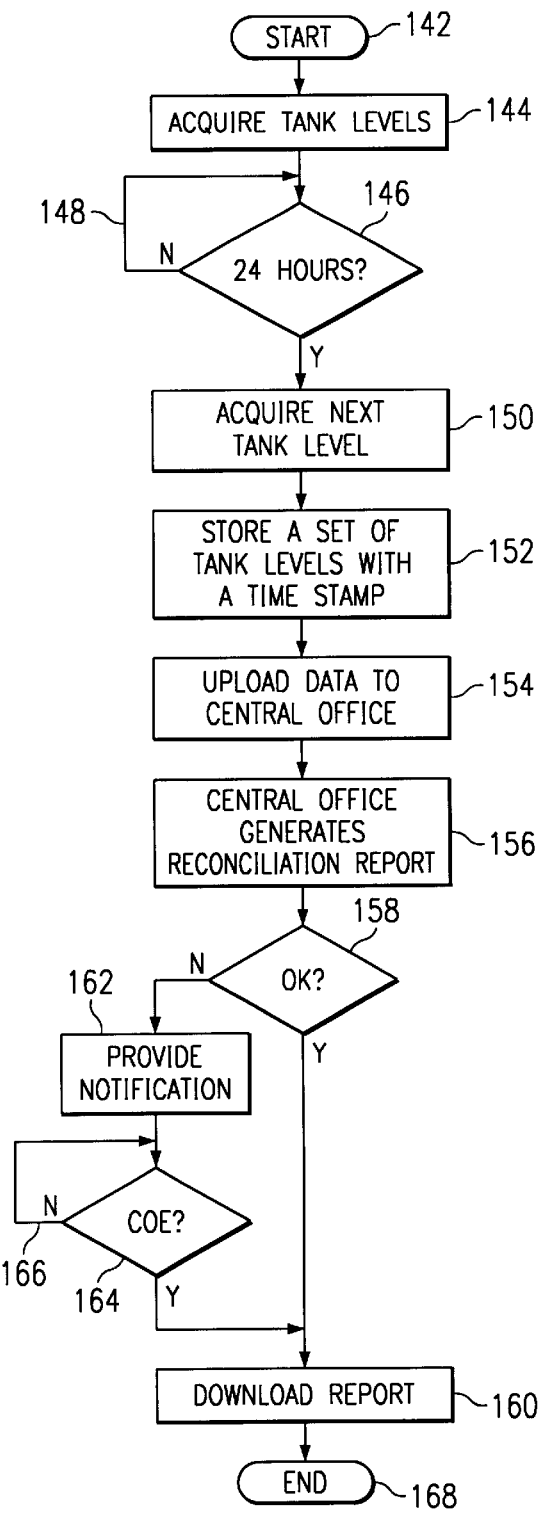
FIG. 5 illustrates a flowchart for collecting inventory information within the bulk shipping terminal.

Referring now to FIG. 5, there is illustrated a flowchart of the process of operating the CPU 70 for collecting inventory information within the bulk shipping terminal 44. This process is typically performed once per day, at a predetermined time of day at which trucks are not allowed to load so that inventory values will be stable. The bulk shipping terminal data collection process is initiated at a start step 142. Then, in a step 144, data relating to the tank levels for the storage tanks in the shipping terminal 44 is gathered. A timing step is depicted in a decision block 146, which determines when data for the measured tank levels should be acquired, this being depicted as a 24 hour period. If the time for repeat measurements has not occurred, then the process will proceed along the flowpath 148 and loop back to the time decision block 146. If the time interval between the measurements of block 146 has passed, then the process will advance to a step 150 of acquiring measurements of the tank levels. A set of the tank levels and corresponding time stamps are stored as tank level data in the step 152. In the step 154 the tank level data is uploaded to the central office 46 and stored in the central database 74. The CPU 72 in the central office 46 will then compare the difference stored in the step 154 to the amount of the loads transported from the terminal 44 to generate a reconciliation report, as depicted in the step 156. A reconciliation report compares the calculated volume of products stored in and removed from as determined from bill of lading information, which is metered as it is loaded onto the trucks, versus the measured volume of stored products as determined by tank level readings. Step 158 depicts the step of comparing the difference in tank levels to the loads shipped from the terminal to determine whether to create a reconciliation report in a step 160 and whether to provide a failure notification alarm signal in step 162. If the detected difference exceeds a predetermined threshold level for the reconciliation report, the failure notification step 162 occurs and a manual correction of the error ("COE") 164 may be performed. Then the process proceeds to the step 160 and the reports are printed. Then the end step 168 occurs.

Figure 6:
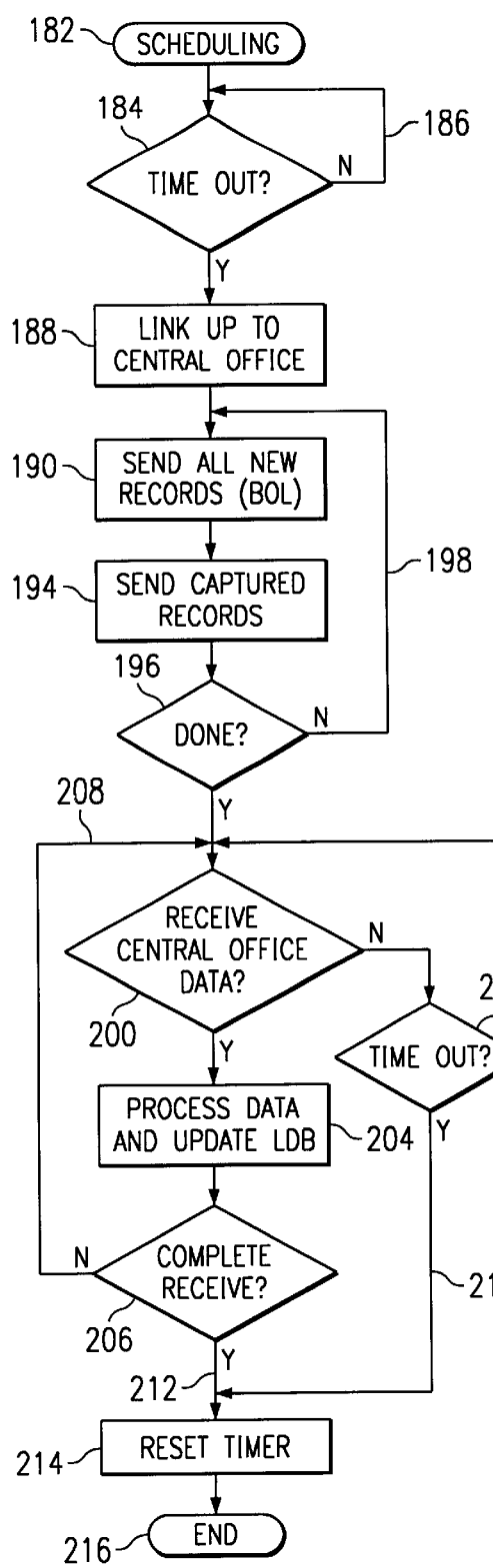
FIG. 6 illustrates a flowchart for transferring data between the central office and the local database.

Referring now to FIG. 6, there is illustrated a flowchart depicting the transmitting and receiving of data between the central office database 74 and the local database 71. The process begins in a scheduling step 182 and proceeds to a time out step 184. The flowchart will loop through a flowpath 186 and back to the beginning of the timer step 184 until a predetermined time is detected. Then, in a step 188, the CPU 70 will link through the global computer network 48 to the central office CPU 72. In a step 190, the CPU 70 will transmit all new records to the central office, such as bills of lading. The various captured records of tank levels and the like are also sent in a step 194 to the central office CPU 72. The process will then proceed from the step of block 194, to a decision block 196, and then through a flowpath 198 to the transmit records step 190 until all the new records and captured records are transmitted from the local database 71 to the central office 46. Once this transmission is complete, the process will proceed from the decision block 196 to the step 200 in which data is received from the central office CPU 72. Data reception will continue until either all of the data is received, or a time out in decision block 202 is effected. Data is received by the CPU 70 in the receive data step 200. The local CPU 70 will process the data and update the local database 71, as depicted in the step 204. The decision block 206 depicts the operation of determining whether the data transmissions are complete, and if not, the process will pass through a flowpath 208 and back to the receive data step 200. However, if a time out condition is detected in the decision block 202, the process will pass along a flowpath 210 and to a reset timer step 214. When data transmission is complete, the process will pass from the decision block 206, through a flowpath 212, and to a reset time step 214. Then the process will reach the end step 216.

The procedure FIG. 6 allows the link to the central office to be made and then forward information thereto. In this manner, the local database 71 at each of the terminals 44 can collect records in the form of the bill of ladings and also additional non-bill of lading records. These are the records which, as described hereinabove, relate to subscriber input information. This subscriber information, as also described hereinabove, can be in the form of various tank level information that is not normally connected with a bill of lading, and other subscriber input information. This information is information that will be sent to the central office. Once the central office receives this data, it then updates the central office database. Once this local central office database has been updated, and the communication link continues, then the central office will take this opportunity to forward update data back to the terminal 44 to which it is communicating with. The reason for this is that the terminal 44 and its local database 71 contain only the information required for the terminal 44 to operate, such as authorized drivers, authorized trucks and customer order data, and the data stored in relation to inventory information and bill of lading information. The access information, for drivers and trucks, and the customer order data is preferably only changed at the central office via subscriber access through a global computer network, and then is downloaded to the terminals to overwrite such information stored in the local database at the terminal when the local terminal 44 contacts the central office. However, an operator at the terminal 44 can change the data also. For example, in the situation where the central office database does not contain sufficient information for the local terminal to allow access to a specific driver of a truck who shows up to a terminal 44, the operator at the terminal could actually input that information to the local database 71 to then allow the driver access thereto by authorizing that driver. It is preferable that this information be loaded into the central database into a master driver access data file stored therein, and then later the information will be downloaded to the local database to overwrite previous local access files. The central database may be updated via a global computer network connection. This is just one method for a terminal operator to input data to the central office database.

Figure 7:
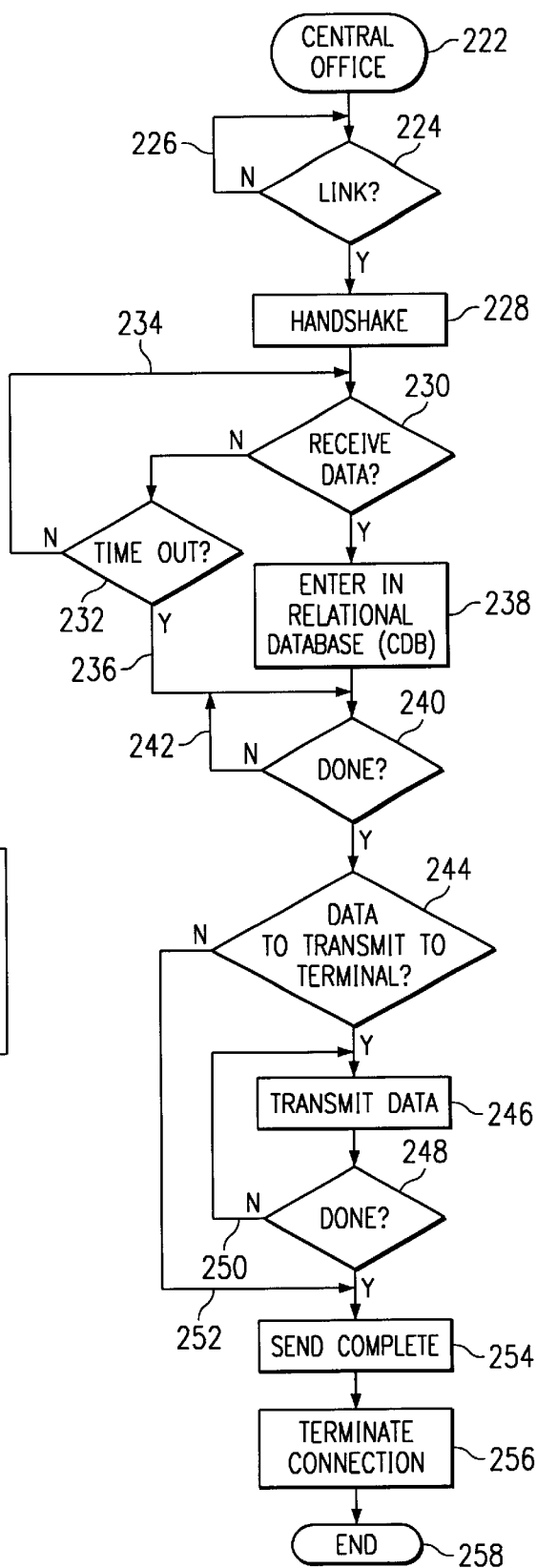
FIG. 7 illustrates a flowchart depicting the operation of the central office.

Referring now to FIG. 7, there is illustrated a flowchart depicting the operation for receiving and transmitting data at the central office. The central office initiates processing in the step depicted by a step 222. In a decision step 224, the central office CPU 72 determines whether to link to the local CPU 70 of the bulk shipping terminal. If not, the process will proceed through a flowpath 226 and then back into the link decision step 224. Once a determination is made to link to the CPU 70 of the bulk shipping terminal 44, the link will be initiated and a hand shake sequence 228 will occur between the central office CPU 72 and the local CPU 70 of the bulk shipping terminal 44. Data from the local CPU 70 will be received by the central office CPU 72 in a step 230, until either a time out occurs as represented by decision block 232, or until the receive data step 230 is complete. Data is uploaded to and received by the CPU 72 in step 230, and then entered into the central database 74 in a step 238, preferably in a relational database configuration. A decision step 240 determines when all of the data has been fully received from the bulk shipping terminal 44 and entered into the central database 74. During the data transfer, the process will flow from the decision step 240 through a process flowpath 242 back to the input of the decision step 240. If a time out occurs in the step 232, the process will proceed to the decision step 240.

After receipt of the data from the local CPU 70 located in the bulk shipping terminal 44 is complete, as determined by the decision step 240, the process will then flow to a data transmit decision step 244. This initiates the transmit data step depicted by the step 246, to transfer driver and vehicle access data, and transport request data from the central database 74, through the central office CPU 72, through the global computer network 48, and to the local CPU 72 for storage in the local database 71. A decision step 248 determines when the data has been fully transmitted to the local CPU 70 in the step 246. If the decision step 248 does not detect that the data transmission is complete, the process will pass through a flowpath 250 to the beginning of a transmit data step 246. Once the CPU 72 detects that the transmission of data depicted in step 246 is complete, in the decision step 248, a "Send Complete" signal is transmitted in a step 254 and the connection to the global computer network is preferably terminated in a step 256. If the decision to send transmit data to the terminal 44 is determined to be negative in the step 244, the process will proceed from the decision step 244, down the flowpath 242, and to the Send Complete step 254. When the Send Complete step 254 is initiated, the connection via the global computer network 48 between the CPU 70 and the central office CPU 72 is then terminated in step 256. The process ends at step 258.

Figure 8:
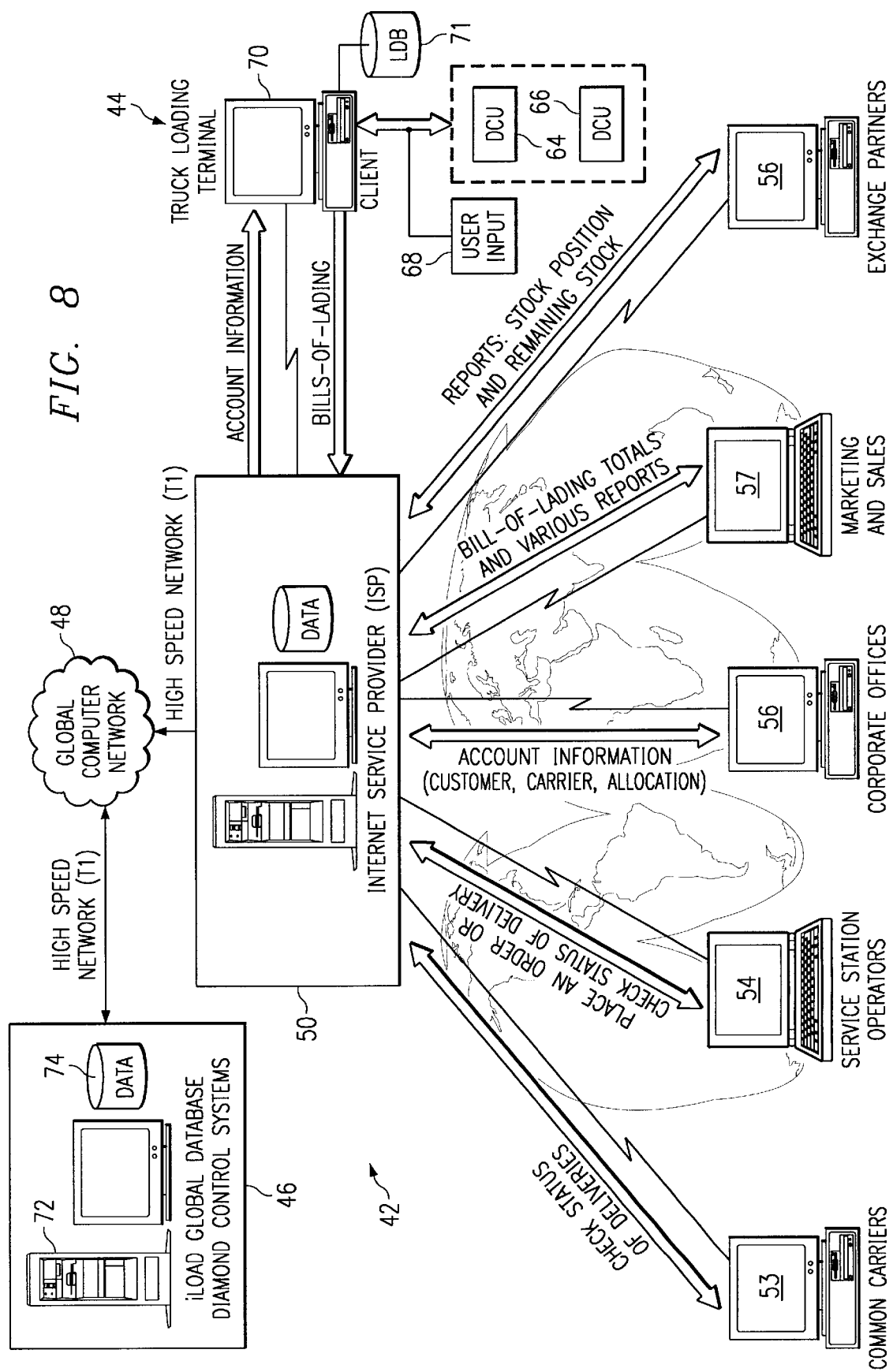
FIG. 8 illustrates a schematic diagram depicting use of the bulk terminal automation system for fuel shipping terminals.

Referring now to FIG. 8, there is illustrated a schematic diagram depicting use of the bulk terminal automation system 42 in a bulk loading terminal 44 for shipping fuel. The various customers 53 through 57 are connected through a single ISP 50 to the global computer network 48 for accessing the CPU 72 at the central office 46 and the data in the relational database of the central database 74. The bulk shipping terminal 44 is connected through the ISP 50 and the global computer network 48, to the central office CPU 72, such that data may be uploaded to and downloaded between the central office database 74 and the local database 71. The subscriber input 68 and the data collection unit 64s through 66 are depicted for interfacing with the CPU 70 of the bulk shipping terminal 44. Transport request data may be transmitted from the various customers 53 and 57 to the central office 46 for storing in the central office database 74. The transport request data may then be distributed from the central database 74 in the central office 46, through the global computer network 48, and to the data storage 71 in the bulk shipping terminal 44. Likewise, data may be collected from the database bulk shipping terminal 44 and then stored in the local database 71 for periodically transmitting through the global computer network 48 and to the database 74 in the central office 46. The data stored in the central office database 74 may then be selectively accessed by the various customers 53 through 57.

Figure 9:
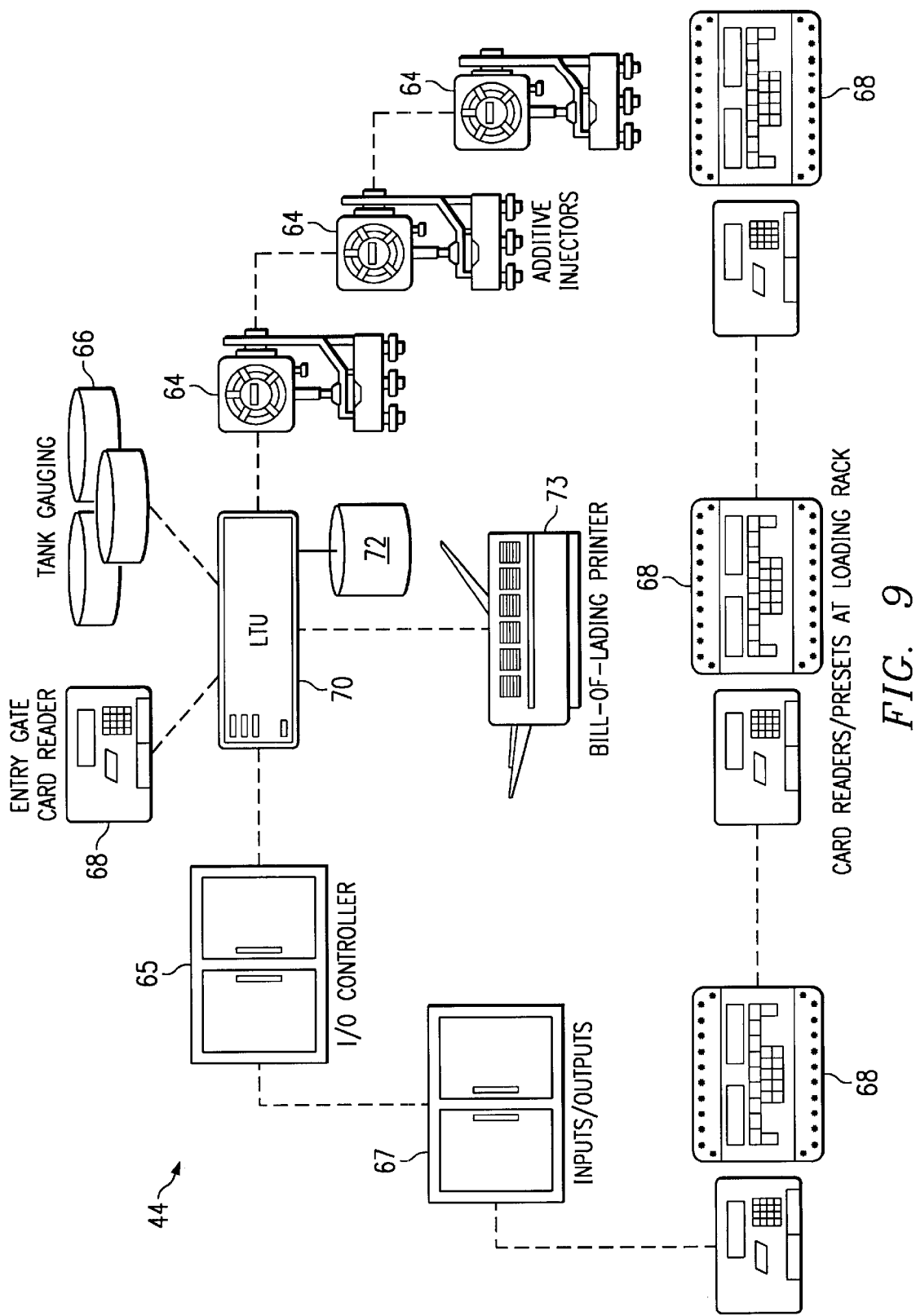
FIGS. 9 illustrates a schematic diagram of the bulk terminal operating system being used in one of the fuel shipping terminals.

Referring now to FIG. 9, there is illustrated a schematic diagram of the bulk shipping terminal 44 for shipping fuel. Various card readers 68 are depicted for the entry gate and various loading racks. Connected to the CPU 70 is a bill of lading printer 73 for printing bills of lading for the drivers to carry in the trucks during shipment. Input/output controller 65 is connected to inputs and outputs 67, which are connected various ones of the card readers 68 for collecting data therefrom. Various additive injectors 64 are connected to the local CPU 70 for controlling injection of additives to provide various fuel blends for the fuel being loaded. Fuel tank gauging is provided by sensors 66.

Figure 10:
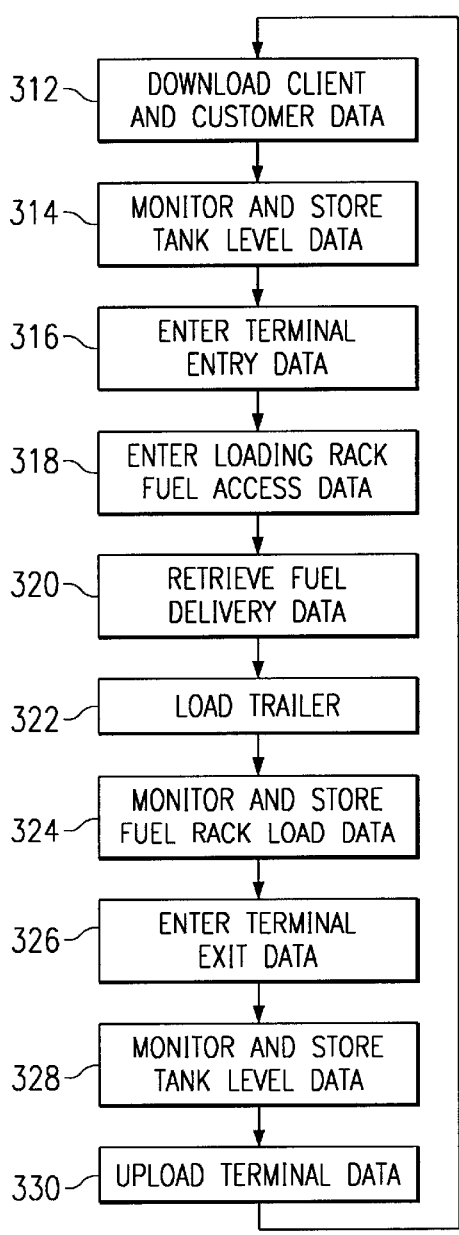
FIG. 10 illustrates a block diagram depicting the process for operation of the local CPU at one of the fuel shipping terminals.

Referring now to FIG. 10, there is illustrated a flowchart depicting the process for operation of the CPU 70 at the bulk shipping terminal 44 for transporting fuel. Driver, truck and trailer access data, and transport request data are downloaded in step 312. In step 314 the tank level data is monitored and then stored in the local database 71. Upon entering the bulk shipping terminal 44, a driver will first enter his personal data in step 316. Then, the driver proceeds to the loading rack, and enters his personal data and customer data in step 318. The local CPU 70 in the bulk shipping terminal 44 will then retrieve fuel delivery data in step 320 from the local database 71. Provided access to the fuel is granted, the trailer is then loaded in step 322. The data from the various sensor units will monitor and store loading data in step 324. The various sensor units for monitoring loading data may include flow meters for measuring the volume of fuel loaded, and also weight scales for determining the weight of the product, such as for measuring the empty and the loaded weights of trucks or containers used for transporting the product. When product is being received into the terminal, the loaded truck, trailer or shipping container weight and the like is measured as the truck enters the terminal and the empty weight is measured after the truck unloads. When product is being shipped from the terminal, the empty weight of the truck, trailer, shipping container and the like is measured prior to loading, and then the loaded weight is measured prior exiting the terminal 44. Then, upon exiting the terminal 44, the driver will enter terminal exit data in step 326. The CPU 70 will continue to monitor and store tank level data in step 328 and then all collected data will be uploaded from the bulk shipping terminal 44, through the global computer network 48, and to the central office 46 for storage in a relational database configuration in the central database 74. Note that this is in the form of a record that corresponds to records stored in the relational database in the central office. The process will then pass along a flowpath 332, and client and customer data will be downloaded from the central office 46 in the step 312.

Figure 11:
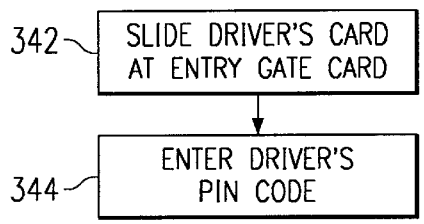
FIG. 11 illustrates a flowchart of the steps for a driver entering terminal access data.

Referring now to FIG. 11, there are depicted the steps for entering the terminal entry data of the step 316 of FIG. 10. First, the driver slides his entry card into the entry gate card reader in step 342. The driver will then enter a pin code in step 344.

Figure 12:
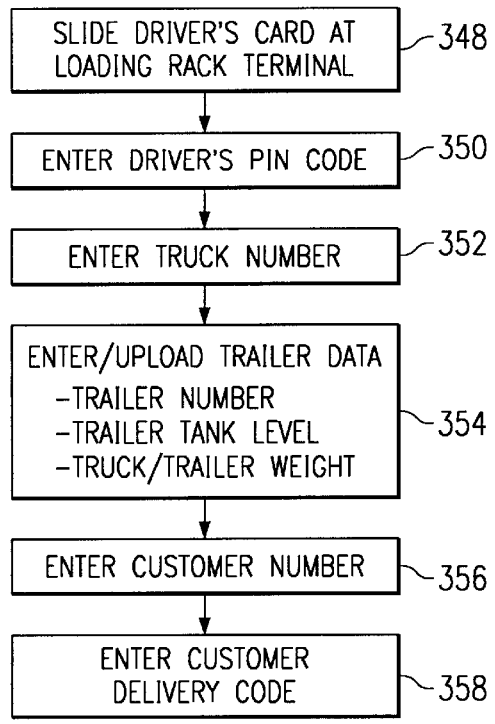
FIG. 12 illustrates a flowchart of the steps for a driver entering loading rack fuel access data.

Referring now to FIG. 12, there is illustrated a flowchart depicting the steps for entering the loading rack fuel access data of the block 318 of FIG. 10. The driver will initially slide his access card at the loading rack terminal in the subscriber input 68, as depicted in step 348. The driver will enter his pin code in step 350, and his truck number in step 352. Truck data will either be entered manually by the driver or by reading a magnetic card for the truck, or it may be uploaded through a data connection to the truck or the trailer in step 354. Such truck data may include the trailer number, the initial trailer tank level prior to loading, and the initial trailer weight prior to loading. If a truck is delivering a load of product into the terminal, the truck data will include the loaded weight prior to delivery of the product, and then after unload, loading the empty weight will be entered into the database. The customer number will then be entered in step 356 and a customer delivery code will be entered in step 358. The customer delivery code 358 will then be correlated to the transport request data stored in the local database 71 to determine the amount of the fuel load and the fuel type to be loaded into the trailer for transport to the customer's location.

Figure 13:
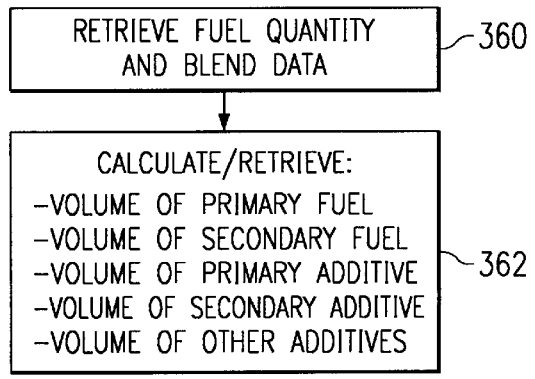
FIG. 13 illustrates a real time monitoring of the fuel delivery data.

Referring now to FIG. 13, there is illustrated the step of retrieving the fuel delivery data of the step 320 of the block diagram of FIG. 10. In step 360, the CPU 70 will access the fuel quantity and blend data from the database 71. Then, the data will be sorted and referenced to determine the volume of primary and secondary fuels, and various additives in the step 362.

Figure 14:
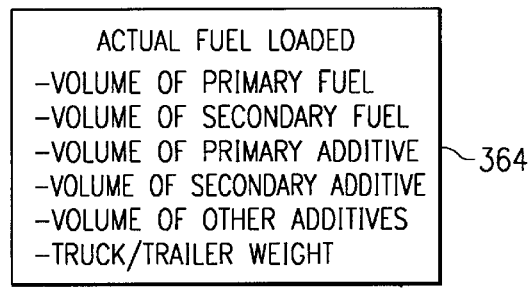
FIG. 14 illustrates a table showing the various parameters monitored and stored by the bulk terminal operating system.

Referring now to FIG. 14, there is depicted an illustrative table 364 showing the various parameters monitored and stored in the step 324 of FIG. 10. The truck loading data includes the amount of fuel actually loaded, including primary and secondary fuel if fuels of different types are blended, and data referring to the amounts of the various additives used to arrive at a fuel blend selected by the customer. The truck loading data may also include the loaded weight of the truck, for comparing to the empty weight of the truck to determine the weight of the fuel loaded. If product is being delivered to the terminal, the truck loading data may then include the loaded truck weight and a later measured empty truck weight. In some embodiments, the trucks may not be weighed, and metered volumes of product may instead be relied upon to determine the amount of product being shipped in particular loads.

Figure 15:
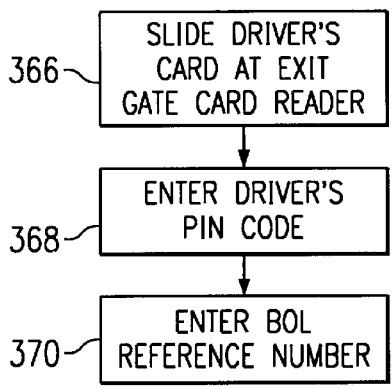
FIG. 15 illustrates a flowchart of a driver entering terminal exit data.

Referring now to FIG. 15, there is illustrated a block diagram of the entry of the terminal exit data step depicted by the block 326 of FIG. 10. At a gate card reader, upon exiting from the bulk shipping terminal, the driver will slide his access card through the card reader in step 366 and then enter a pin or access code 368. The driver will then manually enter a bill of lading reference number in step 370. The driver may then leave the facility and deliver to the load to the customer.

Figure 16:
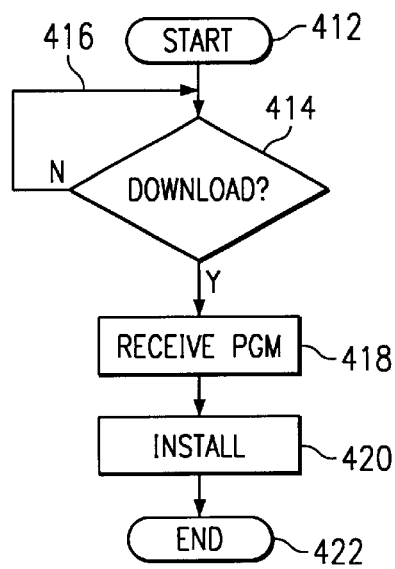
FIG. 16 illustrates a flowchart for downloading software for use in a terminal and for use by a subscriber.

Referring now to FIG. 16, there is illustrated a flowchart depicting the operations to download user software modules at the remote terminal and at remote user locations. A start step 412 is initiated, and then in a download step 414 accessing of the software as requested. In the download step 414, a user may select from various menu items for configuring the software. For example, the terminal may select a data acquisition configuration for uploading data to the central office and receiving access data and security information from the central office 414. If the download step 414 is not actuated, the process will proceed along the flow path 416 back to the start of the download step 414. Once the download step 414 has begun, the receive program step 418 occurs, and the program is received by the user. In the step 420, the software downloaded in the step 418 is installed into the user's computer, preferably with an install wizard to provide furrier customization for the software. The end step 422 ends the process. At this point, the user has loaded their computer software that will allow them to interface with the data collection network 62, create the local database 71, generate local reports and, at their option, upload data to the central office. The alternative to this download step, the preferred method, is to receive the program on a hard storage medium such as a CD ROM.

Figure 17:
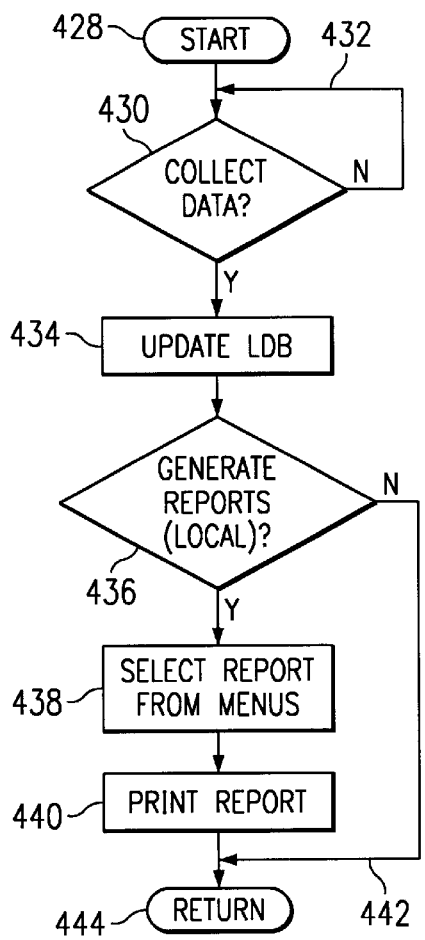
FIG. 17 illustrates a flowchart for generating local reports for a terminal using the subscriber software downloaded in FIG. 16.

Referring now to FIG. 17, there is illustrated a flowchart depicting the operation of the downloaded software at a single terminal. The start step 428 initiates the process. In the step 430, data is collected from the remote data collection units, which are preferably proprietary units, wherein the software downloaded from the central office has the capability of accessing the proprietary system and collecting data therefrom. If the data collection step 430 is not complete, the process will proceed along the flow path 432 to the beginning of the data collection step 430. Once the data collection step 430 is complete, the process proceeds to the update local database step 434. The local database 71 is then updated with the collected data. In a step 436 local reports may be generated from the data in the local database 71. Any discrepancies will be evaluated by the local operator to determine if there has been the unauthorized removal of product. The user at the terminal may select from a menu of various reports in the step 438. In the step 440, the selected reports are printed. If, at the generate local report step 436 the user does not wish to generate local reports, the program will proceed along a flow path 442 to a return step 444. After reports are printed in the step 440, the process proceeds to the return step 444. It should be noted that more detailed reports regarding compiled usage data will require accessing the central database to generate reports and licensing a subscriber.

Figure 18:
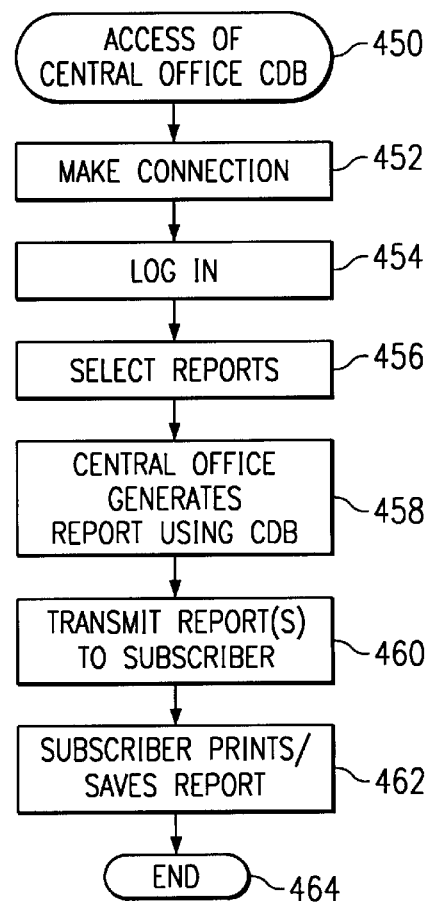
FIG. 18 illustrates a flowchart of a subscriber generating reports from the central office database.

Referring now to FIG. 18, there is illustrated a flowchart of a remote subscriber accessing reports from the central database. The step 450 illustrates the step of the remote subscriber initiating the process of accessing the central office and the central database. In the step 452, the connection is made between the central office and the remote subscriber. In the step 454 the subscriber logs into the central office, providing an access code which is checked against various authorization codes. It should be noted that the log-in step 454 determines the data to which the subscriber has access. Only particular data sets may be accessed by the subscriber, as authorized by the central office. Once the subscriber has completed the log-in step 454, the subscriber then addresses a menu in which he can select reports in a step 456 which the remote subscriber is authorized to receive. In the step 458, the central office generates the reports using the central database according to the reports selected by the remote subscriber in the step 456. In a step 460, the reports are transmitted to the subscriber. In the step 462, the subscriber prints and saves the reports electronically. The process ends in the step 464.

It should be noted that the reports from the central office 44 may be printed in step 462 or the reports may be saved. The report data is preferably formatted in either an html or a text file such that the reports which the subscriber receives in the step 460 can be printed and saved in the step 462 for read-only use. The subscriber may also retrieve processed data from the database 44 of the central office 46, which is compiled in a format for importing into the subscriber's accounting system, such as for billing. However, the subscriber will preferably not retrieve raw data, but will only receive data which has been processed and formatted into reports.

A subscriber downloads operating software from the central office, and then once the software is downloaded, the subscriber requests a password from the central office 46 and then the subscriber is configured for use on the system. For example, a subscriber may own or operate three terminals 44. When the subscriber is configured, the subscriber is associated in the CBD 74 with those three terminals 44. The subscriber can then request the central office 46 to access data associated with the terminals 44 (the data previously uploaded from the associated three terminals 44) and then generate desired reports. It is noted that the reports generated by the central office 46 are at a higher level and have more data with which to operate. Further, the data is organized in a relational database 74. The subscriber is also allowed to input data to the database 74 at the central office 46, which is then downloaded to the respective terminals 44 upon the next update for uploading data from the respective terminals 44. This allows a subscriber to update all terminals for their account from a single location, without having to access each database 71 for updating. From an overall system standpoint, the terminal 44 is not required to have associated therewith the relatively complex software required to provide the necessary reporting functions, with its commensurate maintenance requirements, set up requirements, etc. There is only required the data collection functions, minimal reporting functions and central office interface functions.

Figure 19:
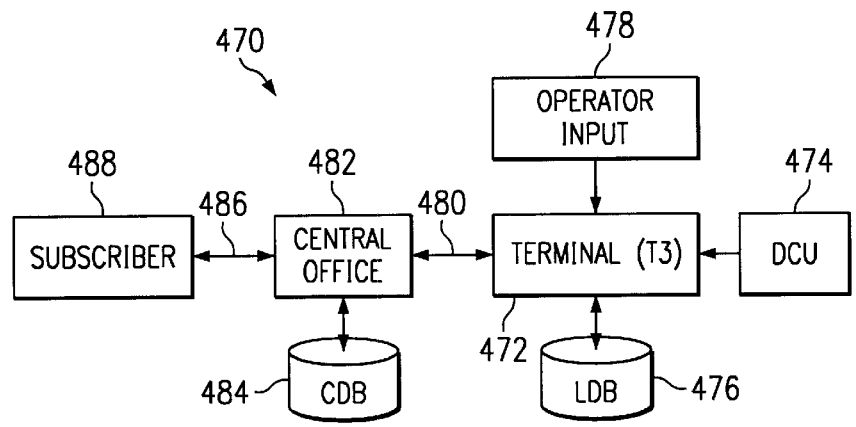
FIG. 19 illustrates a block diagram of the data transfer between a loading terminal and a central office, and a downloading of reports to a subscriber.

Referring to FIG. 19, there is illustrated a block diagram which depicts transmission of data from the terminal 44 to the central office 46 and then to a remote subscriber. Bill of lading data is collected by data collection units 474, and then stored in a local database 476. Additionally, the operator input device 478 is provided for updating such data as driver access codes and bill of lading information into the terminal 472 which is labeled T3. The data is then transmitted over a communication link 480 to a central office 482. Preferably, the communication link 480 is provided by ISPs as discussed above in reference to FIG. 2. The central office 482 then stores the collected data in the central office database 484. Reports are then generated and downloaded through a communication link 486 to the subscriber 488, which may be remote from the terminal 472, or may be located at the terminal 472. Preferably, the communication link 486 is provided by the global computer network 48, which is discussed above in reference to FIG. 2. Data may also be uploaded from the subscriber 488 through the communication link 486 to the central office 482. Such data may include driver access data and customer order data for downloading from the central office 482 to the terminal 472 for storage in the terminal database 476. Preferably driver access and customer order data is monitored as master files in the CDB 484 and may be selectively updated by the subscriber 488. The updated driver access and customer order data is then downloaded from the CDB 484, through the communication link 480 and to the LDB 476 in the terminal 472 to update the LDB 476. Updates in the LDB 476 preferably overwrite previous driver access and customer order data, such that a master record of such information is controlled and modified by subscriber accessing the CDB 484.

Figure 20:
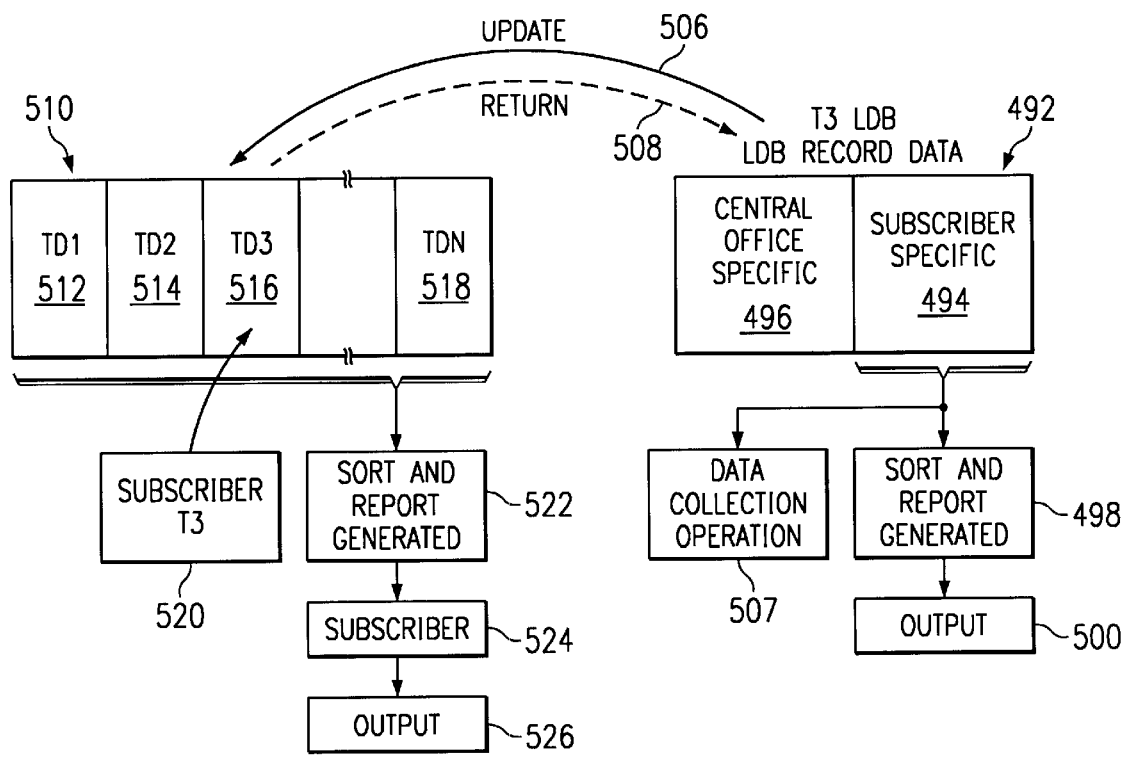
FIG. 20 illustrates a block diagram of data being transferred between a subscriber, a terminal and a central office database, and the generation of reports at the local terminal and for the subscriber.

Referring now to FIG. 20, there is illustrated a block diagram of the data transfer and report generation process. The local database 492 of the terminal 472, labeled T3, includes two components, one being user specific data 494 and the other being central office specific data 496. It should be noted that user specific data 494 may be redundant with some of the central office specific data 496, but the user may not be allowed access to the central office specific data 496, or it may be that this data is not necessary for the terminal 472 to operate. Additionally, the central office specific data 496 of the local database 492 will include data received from the proprietary data collection network 62 and the proprietary DCU 64 through 66 (shown in FIG. 2). The local user may generate reports in the step 498 using only the user specific data 494 of the database 492, such as inventory reports and bill of lading information reports. Such data may also include driver access data downloaded from the central office.

The local data 492 is periodically transmitted through the interface connection 506 to the central office, either through actions of the user or automatically, and is stored in the central office database 510. Data may also be downloaded from the central office database 510 along a return path 508 to the local database 492 during an update cycle, such as driver access information and customer order information. The central database 510 includes various data sets 510 through 518, which are specific to each of terminals T1, T2, through TN, the data sets labeled TD1, TD2, TD3, . . . , TDN for associated terminals T1, T2, T3, . . . TN. In the example shown in FIG. 20, the local database 492 is downloaded through link 506 to the data record set 516 TD3. The central office specific data 496 from the local database 492 is downloaded into the portion 516 of the database 510 for storing the data set TD3. Additionally, a remote subscriber 520 may modify the master driver access data and the like for storage in the database section 516 of the database 510, for later updating of the local database 492. (Note that this update may include multiple sets of data sets for all terminals 472 owned by the subscriber.) The subscriber 520 may access a menu to selectively sort and generate reports in the step 522 using one or more of the data sets. (It should be remembered that the datasets are actually arranged in a relational database.) The reports are then transmitted to the subscriber in the step 524, and the subscriber may output the reports in the step 526. It should be noted that the remote subscriber 520 and 524 can select from various reports, yet will only be allowed access to particular data for which they are authorized access. Additionally, the data they access is not raw data, but rather compiled data for which the particular subscriber is authorized to access and has subscribed to.

The bulk shipping terminal automation system of the present invention collects data in various shipping terminals regarding loads of product removed from the terminal, such as information recorded in bills of lading. The terminal automation system also records inventory information. Such information is then uploaded to a central database, which collects data from terminals in various remote locations. The central database also contains master driver access data and customer order data which may be updated by a subscriber at a terminal, or at a location which is remote from the particular terminal to which the data applies. The driver access data maintained in the central database may be utilized at several remote locations. The driver access data and customer order data may then be downloaded to the various terminals to which is applies, preferably overwriting prior access data and customer order data. Remote subscribers may also select among various reports formatted to present the central office data. Such report formats are provided for presenting data according to various reporting software, which are selectable by the subscribers and may be customized by various subscribers. The data reports may also included data complied from several terminals into one report. Preferably, the data is transmitted between terminals and the central office via a global computer network. Reporting services are also preferably selected and transmitted to subscribers via the global computer network. Driver access data and customer order data are also entered directly into the central database by subscribers, and then downloaded from the central database to the various terminals to update driver access and customer order data in the local databases. Additionally, customers to whom shipments are being made may be provided with limited access to the central database for printing reports in order to check on the status of both pending and delivered orders.

Although the preferred embodiment has been described in detail, it should be understood that various changes, substitutions and alterations can be made therein without departing from the spirit and scope of the invention as defined by the appended claims.

What is claimed is:

1. A method for automating and coordinating delivery operations of a bulk shipping terminal, comprising the steps of:

providing a local computer network disposed at the bulk shipping terminal, the local computer network including a local CPU and a local database, a data collection network which includes data collection units and a subscriber input device, and the local computer network further including a local data transfer connection between said local CPU at the bulk shipping terminal and a global computer network;

providing a central office having a central database configured in a relational database format, wherein data from the local database is received via the global computer network and later selectively retrieved from the central database, and further providing a remote data transfer connection between the central office and the global computer network;

collecting data from the data collecting units via the data collection network, and then storing the collected data locally in the local database;

entering subscriber input data to request driver access to bulk goods stored in the bulk shipping terminal, and storing the subscriber inputs in the local database;

comparing the input data to stored transport request data to determine whether to allow the driver access to the bulk goods;

storing loading data and inventory data in the local database;

transmitting the loading and inventory data from the local database, through the global computer network, and to the central office;

storing the transmitted loading and inventory data in the central database; and providing selected data compilations made at the central office to various customers in response to corresponding customer requests and according to respective customer selected data formats.

2. The method according to claim 1, further comprising the steps of:

entering the transport request data relating to driver access, customer shipments, and customer delivery requirements at the central office for storage in the central database;

downloading the transport request data relating to driver access, customer shipments, and customer delivery requirements through the global computer network to the local CPU in the bulk shipping terminal; and storing the downloaded transport request data in the local database.

3. The method according to claim 2, wherein the step of providing selected data compilations further comprises the acts of relating the transmitted loading and inventory data to the transport request data initially stored in the central database.

4. The method according to claim 3, further comprising the step of the customers making the customer requests for selected data compilations via the global computer network.

5. The method according to claim 4, wherein the selected data compilations are automatically customized in response to the customer requests made via the global computer network.

6. The method according to claim 2, further comprising the step of:

providing for changing the access information for drivers and customer order data at the central office.

7. The method according to claim 1, wherein the selected data compilations are delivered via the global computer network.

8. The method according to claim 1, further comprising:

providing a second local computer network disposed at a second, remote shipping terminal, which is remotely disposed from the bulk shipping terminal set forth above, the second local computer network including a second local CPU and a second local database, second data collection units and a second subscriber input device, and a second local data transfer connection between said second local CPU at the second bulk shipping terminal and a global computer network; and transferring transport request data and the loading and inventory data between the second remote shipping terminal and the central office via the global computer network; and wherein the step of providing selected data compilations includes compiling data from both the local shipping terminal and the second remote shipping terminal.

9. The method according to claim 1, further comprising the step of the customers making the customer requests for selected data compilations via the global computer network.

10. The method according to claim 9, wherein the selected data compilations are automatically customized in response to the customer requests made via the global computer network.

11. The method according to claim 10, wherein the selected data compilations are delivered via the global computer network.

12. The method according to claim 1, wherein the step of providing a local computer network further comprises the step of:

providing one or more metering devices disposed with a storage container for bulk goods and responsive to the local CPU for regulating an amount of additive material to be added to the bulk goods.

13. The method according to claim 12, wherein a metering device comprises an additive injector.

14. The method according to claim 1, wherein the data collection network includes data collection units for metering levels of stored and dispensed bulk materials.

15. The method according to claim 1, wherein the data collection units include one or more tank gauging sensors.

16. The method according to claim 1, wherein the subscriber input device comprises a card reader coupled to the local CPU via an I/O controller and disposed at an entrance to a facility of the bulk shipping terminal.

17. The method according to claim 1, wherein the step of providing a central office further comprises the step of:

enabling bidirectional data exchange between the local database and the central office database over the global computer network.

18. The method according to claim 17, wherein the step of enabling comprises the step of:

providing for the transfer of data between the local database and the central office database over the global computer network under the control of either the local computer network disposed at the bulk shipping terminal or a computer disposed at the central office.

19. The method according to claim 17, wherein the step of enabling comprises the step of:

providing periodic data exchange between the local database and the central office database.

20. The method according to claim 1, wherein the step of collecting data comprises the step of:

retrieving bulk goods delivery data including quantity and blend data.

21. The method according to claim 20, wherein the bulk goods comprise a fuel product and the step of retrieving comprises the step of:

acquiring volume data for one or more of primary fuel, secondary fuel, primary additive, secondary additive and other additives.

22. The method according to claim 1, further comprising the steps of:

responsive to the step of comparing the input data, allowing the driver access to the bulk goods;

monitoring a loading operation of bulk goods to a trailer operated by the driver allowed access to the bulk goods; and receiving input data from an exit location conveying departure data of the trailer from the bulk shipping terminal.

23. The method according to claim 22, wherein the step of allowing the driver access to the bulk goods comprises the steps of:

presenting a driver's access card to a card reader at an entry gate to the shipping terminal; and entering a driver's access PIN code at the entry gate card reader.

24. The method according to claim 22, wherein the step of allowing driver access to the bulk goods comprises the steps of:

following entrance to the shipping terminal, presenting a driver's access card to a card reader at a loading rack;

entering a driver's PIN code at the loading rack card reader; and entering transport data including one or more of a truck number, trailer data and customer data.

25. The method of claim 24, wherein the step of entering trailer data comprises the step of:

entering one or more of a trailer number, a trailer tank level and a truck/trailer weight.

26. The method of claim 24, further comprising the step of allowing driver access to the bulk goods comprises the steps of:

loading the bulk goods;

presenting the driver's access card to a card reader at an exit gate from the shipping terminal; and entering the driver's access PIN code at the exit gate card reader.

27. The method according to claim 1, wherein the step of storing loading data in the local database further comprises the step of:

monitoring bulk goods loading data, and storing data for actual bulk goods loaded.

28. The method according to claim 27, wherein the bulk goods comprise a fuel product and the step of monitoring comprises the step of:

acquiring volume data for one or more of primary fuel, secondary fuel, primary additive, secondary additive and other additives.

29. The method according to claim 1, wherein the selected data compilations include inventory information collected within the bulk shipping terminal.

30. The method according to claim 29, further including the step of:

issuing a failure notification when the inventory information indicates a discrepancy exists between an actual value and an expected value of the inventory information.

31. The method according to claim 1, wherein the selected data compilations include reconciliation reports of products stored in and removed from the bulk terminal.

32. The method according to claim 1, further comprising the step of:

printing a bill of lading for bulk goods loaded at the bulk terminal for issue to a driver receiving access for loading the bulk goods.

33. The method according to claim 1, further comprising the step of:

provinding a third local computer network disposed at a third, remote location and including a third local CPU, a third local database and a third local data transfer connection between the third local CPU and a global computer network; wherein the third local computer network comprises a customer terminal selected from the group including a common carrier, a service station operator, a corporate office, a marketing department and an exchange partner.

34. The method according to claim 33, wherein the step of providing further comprises the steps of:

enabling the transfer of data between a customer terminal and the central office;

storing customer data transferred to the central office in the central database; and providing for selective access of customer data in the central database by a customer terminal.

* * * * *